(12) United States Patent
Chuang

(10) Patent No.: US 8,451,233 B2
(45) Date of Patent: May 28, 2013

(54) SENSOR PIXEL AND TOUCH PANEL THEREOF

(75) Inventor: Kai-Lan Chuang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 1393 days.

(21) Appl. No.: 12/030,671

(22) Filed: Feb. 13, 2008

(65) Prior Publication Data

US 2009/0200088 A1    Aug. 13, 2009

(51) Int. Cl.
*G06F 3/041*    (2006.01)

(52) U.S. Cl.
USPC .......................................................... 345/173

(58) Field of Classification Search
USPC ..................... 345/104–106, 156–178
See application file for complete search history.

(56) References Cited

U.S. PATENT DOCUMENTS

| | | | |
|---|---|---|---|
| 6,747,638 B2 * | 6/2004 | Yamazaki et al. | 345/207 |
| 7,184,009 B2 * | 2/2007 | Bergquist | 345/90 |
| 7,800,602 B2 * | 9/2010 | Choi et al. | 345/207 |
| 2003/0201956 A1 * | 10/2003 | Anderson et al. | 345/82 |
| 2007/0262966 A1 * | 11/2007 | Nishimura et al. | 345/173 |
| 2009/0109190 A1 * | 4/2009 | Elias | 345/174 |

FOREIGN PATENT DOCUMENTS

| | | |
|---|---|---|
| TW | 200519720 | 6/2005 |
| TW | 200639772 | 11/2006 |
| TW | 200802058 | 1/2008 |

OTHER PUBLICATIONS

"Office Action of Taiwan Counterpart Application", issued on Jan. 31, 2012, p. 1-p. 9.

* cited by examiner

*Primary Examiner* — William L Boddie
*Assistant Examiner* — Carolyn R Edwards
(74) *Attorney, Agent, or Firm* — J.C. Patents

(57) ABSTRACT

A sensor pixel and a touch panel using the same are provided herein, wherein the touch panel has m scan lines and n readout lines. The sensor pixel includes a sensing capacitor, a readout transistor, a reset transistor, a base transistor, and a photo transistor. The photo transistor included in the sensor pixel produces a photo leakage current when it is exposed to a light. The light obstruction characteristic of the photo transistor is utilized to detect the locations of the touched sensor pixels. By proper timing control, the present invention not only can be applied to the multi-finger detection, but also is easy to be implemented.

10 Claims, 4 Drawing Sheets

SENSOR PIXEL AND TOUCH PANEL THEREOF

BACKGROUND OF THE INVENTION

1. Field of Invention

The present invention relates to a sensor pixel of a touch panel, and more particular, utilizes the sensor pixel having a photo transistor to detect a location of the finger.

2. Description of the Related Art

With great advance of electronic technique and popularity of wireless communication and internet, the portable devices having light, thin and small advantages gradually become a data access platform in a new generation. Nevertheless, not all the equipments have common usage input and output (I/O) interfaces for human, such as keyboards or mice. Hence, the touch panel is often applied to be a human-machine interface between human and intelligent equipments for controlling.

Generally, the resistive touch panel is composed of two conductive layers separated by thin space. When users press the touch panel, the layers are connected at certain point and thereby a voltage variation corresponding to the certain point is generated. Through converting the analog signal with the voltage variation into a digital signal by analog to digital converter (ADC) and processing the digital signal, the coordinates of horizontal and vertical axes of the pressure point can be located. However, the resistive touch panel gets damaged easily by frequently pressing because of having no protective film, and only a single pressure point can be detected on the resistive touch panel. If there is a plurality of pressure points, i.e. multi-finger, the resistive touch panel is not able to determine the actual position of the pressure point. Besides, disposing the layers not only increases the thickness of the touch panel, but also affects the light transmission for liquid crystal display (LCD). Furthermore, the resistive touch panels can not precisely locate the positions of the pressure points. Consequently, the resistive touch panel cannot satisfy the requirement of consumers.

Another type of touch panel is the optical touch panel utilizing a plurality of infrared transmitters and infrared receivers disposed around it, that is, the infrareds produced from the infrared transmitters in the horizontal and vertical directions forms an array arrangement. When an opaque object obstructs one of the infrareds transmitting, the position of pressure point in horizontal and vertical axes is located. However, the optical touch panel is sensitive to even a tiny object or external light disturbance, and this matter causes incorrect position detection. Therefore, the factories and stores extremely make effort on designing the touch panel that can solve the said problems and overcome the disadvantages.

SUMMARY OF THE INVENTION

The invention provides a sensor pixel and a touch panel using the same that utilize a photo transistor to detect the situation of light obstruction on each sensor pixel, and thereby to indicate the location of the finger. Since the sensor pixel is the smallest detecting unit, the touch panel of the present invention not only can provide precise location of the finger or multi-finger, but also has no needs of disposing conductive layers for saving the volume of the touch panel and having better light transmission.

The sensor pixel of a touch panel having m scan lines and n readout lines is provided in the present invention. The sensor pixel includes a sensing capacitor, a readout transistor, a reset transistor, a base transistor and a photo transistor. The readout transistor has a gate, a first source/drain, and a second source/drain respectively coupled to the $i^{th}$ scan line, the $j^{th}$ readout line, and a first terminal of the sensing capacitor, wherein $1 \leq i \leq m$ and $1 \leq j \leq n$. The reset transistor has a gate, a first source/drain, and a second source/drain respectively coupled to the $(i+1)^{th}$ scan line, a second terminal of the sensing capacitor, and a first voltage. The base transistor has a gate receiving an inverted signal of the $i^{th}$ scan line, and has a first source/drain and a second source/drain respectively coupled to the first terminal of the sensing capacitor and a second voltage. The photo transistor has a gate, a first source/drain, and a second source/drain respectively coupled to the $i^{th}$ scan line, the second terminal of the first capacitor, and the second voltage, wherein the photo transistor produces a photo leakage current when it is exposed to a light.

The touch panel having m scan lines and n readout lines is provided in the present invention. The touch panel includes a plurality of sensor pixels and a readout circuit, wherein each of sensor pixels includes a sensing capacitor, a readout transistor, a reset transistor, a base transistor, and a photo transistor. The readout transistor has a gate, a first source/drain, and a second source/drain respectively coupled to the $i^{th}$ scan line, the $j^{th}$ readout line, and a first terminal of the sensing capacitor, wherein $1 \leq i \leq m$ and $1 \leq j \leq n$. The reset transistor has a gate, a first source/drain, and a second source/drain respectively coupled to the $(i+1)^{th}$ scan line, a second terminal of the sensing capacitor, and a first voltage. The base transistor has a gate receiving an inverted signal of the $i^{th}$ scan line, and has a first source/drain and a second source/drain respectively coupled to the first terminal of the sensing capacitor and a second voltage. The photo transistor has a gate, a first source/drain, and a second source/drain respectively coupled to the $i^{th}$ scan line, the second terminal of the first capacitor, and the second voltage. The photo transistor produces a photo leakage current when it is exposed to a light. The readout circuit respectively coupled to the readout lines for judging whether one of the sensor pixels is touched according to a voltage across the corresponding sensing capacitor.

In the foregoing touch panel, the readout circuit in one embodiment of the present invention includes a plurality of readout units and each of the readout units includes an operational amplifier, a first capacitor and a first transistor. The operational amplifier has an inverting terminal coupled to the $j^{th}$ readout line, a non-inverting terminal coupled to the second voltage, and an output terminal generating an output voltage. The first capacitor has a first terminal and a second terminal respectively coupled to the inverting terminal and the output terminal of the operational amplifier. The first transistor has a gate receiving a reset signal, a first source/drain coupled to the inverting terminal of the operational amplifier, and a second source/drain coupled to the output terminal of the operational amplifier.

The present invention provides a sensor pixel and a touch panel using the same that utilize the characteristic of the photo transistor to detect the location of the finger or multi-finger. Since the photo transistor produces a photo leakage when it is exposed to a light, the present invention measures a voltage across the sensing capacitor and processes the voltage signal to judge whether the corresponding sensor pixel is touched. By proper timing control, the location of the finger or multi-finger can be immediately and precisely detected.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
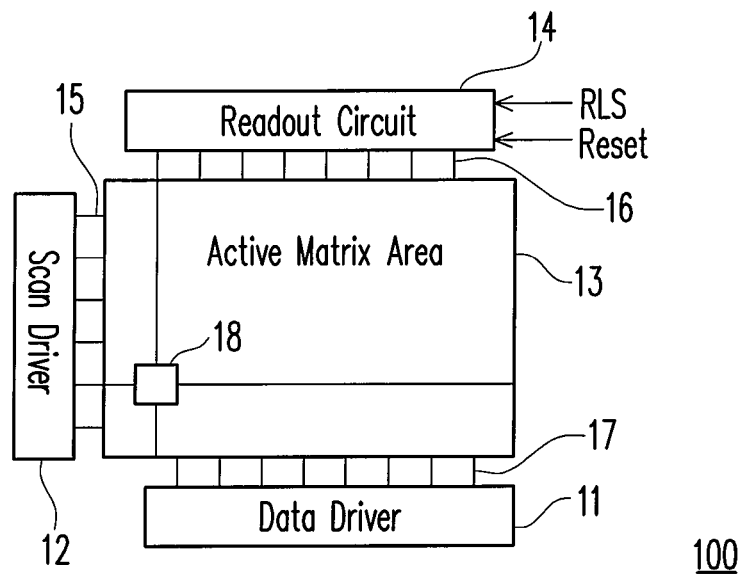
FIG. 1 is a diagram of the touch panel according to an embodiment of the present invention.

FIG. 1 is a diagram of the touch panel according to an embodiment of the present invention. Referring to FIG. 1, the touch panel 100 includes a scan driver 12, a data driver 11, a readout circuit 14 and an active matrix area 13, wherein the touch panel 100 has m scan lines 15 and n readout lines 16. There are a plurality of display pixels (not illustrated in FIG. 1) and a plurality of sensor pixels 18 arranged in the active matrix area 13. The scan driver 12 transmits a scan driving signal to the display pixels through the scan lines 15 and the data driver 11 transmits a data driving signal to the display pixels through the data lines 17 for displaying an image frame.

Figure 2:
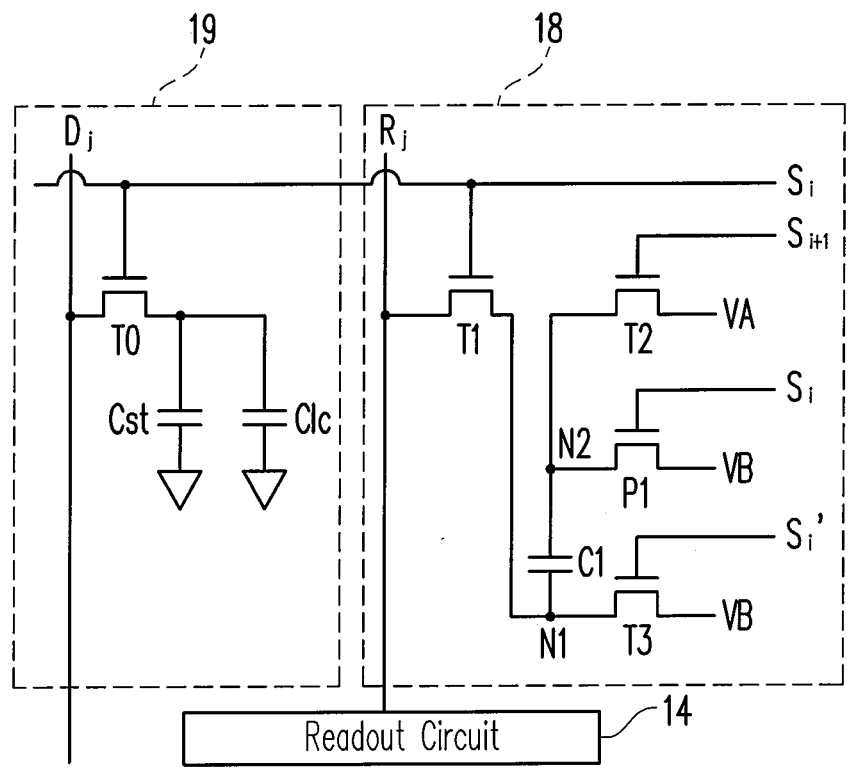
FIG. 2 is a circuit diagram of the display pixel and the sensor pixel coupled together according to the embodiment of the present invention.

FIG. 2 is a circuit diagram of the display pixel and the sensor pixel coupled together according to the embodiment of the present invention. Referring to FIG. 2, the display pixel 19 includes a transistor T0, a storage capacitor Cst and a liquid crystal layer, represented by a capacitor Clc. The transistor T0 has a gate, a first source/drain, and a second source/drain respectively coupled to the $i^{th}$ scan line $S_i$, the data line $D_j$, and both the storage capacitor Cst and the liquid crystal capacitor Clc, wherein $1 \leq i \leq m$ and $1 \leq j \leq n$. When the $i^{th}$ scan line $S_i$ is asserted, the transistor T0 is conducted, as a result, the data driving signal is stored in the storage capacitor Cst via the data line $D_j$ and the conducted transistor T0. Then, the liquid crystal layer is responded to the delivered data driving signal to show the corresponding transparency.

Referring to FIG. 2, the sensor pixel 18 includes a sensing capacitor C1, a readout transistor T1, a reset transistor T2, a base transistor T3 and a photo transistor P1. The readout transistor T1 has a gate, a first source/drain, and a second source/drain respectively coupled to the $i^{th}$ scan line $S_i$, the $j^{th}$ readout line $R_j$, and a first terminal N1 of the sensing capacitor C1. The reset transistor T2 has a gate, a first source/drain, and a second source/drain respectively coupled to the $(i+1)^{th}$ scan line $S_{i+1}$, a second terminal N2 of the sensing capacitor C1, and a first voltage VA. The base transistor T3 has a gate receiving an inverted signal $S_i'$ of the $i^{th}$ scan line $S_i$, and has a first source/drain and a second source/drain respectively coupled to the first terminal N1 of the sensing capacitor C1 and a second voltage VB. The photo transistor P1 has a gate, a first source/drain, and a second source/drain respectively coupled to the $i^{th}$ scan line $S_i$, the second terminal N2 of the first capacitor C1, and the second voltage VB, wherein the photo transistor P1 produces a photo leakage current when it is exposed to a light.

Figure 3:
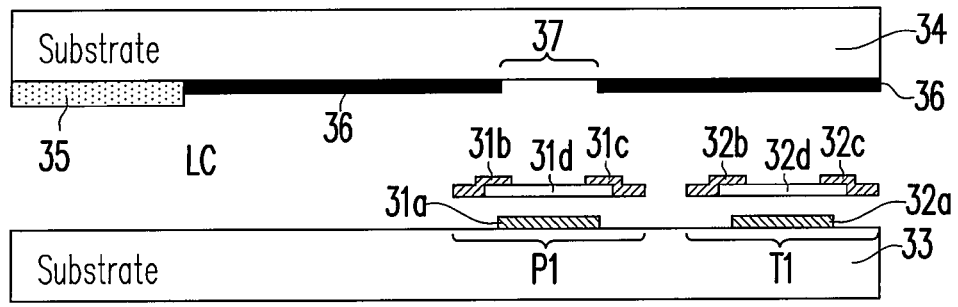
FIG. 3 is partial structure diagram of the sensor pixel according to the embodiment in FIG. 2.

FIG. 3 is partial structure diagram of the sensor pixel according to the embodiment in FIG. 2. Referring FIG. 3, the photo transistor P1 and the readout transistor T1 are formed on the substrate 33. The photo transistor P1 includes the gate 31a, the first source/drain 31b, the second source/drain 31c and the channel layer 31d. The readout transistor T1 includes the gate 32a, the first source/drain 32b, the second source drain 32c and the channel layer 32d. In addition, the color filter 35 and black matrix 36 are formed on the substrate 34, wherein the liquid crystal layer LC is formed between the substrates 33 and 34. It is noted that the region 37 on substrate 34, which corresponds to the channel layer 31d of the photo transistor P1, is not formed with black matrix 36 so that the region 37 on substrate 34 can be called as opening or light transmissible. Therefore, the photo transistor P1 is turned on to produce the photo leakage current when it is exposed to the light; else the photo transistor P1 is turned off when a finger or other object covers the region 37.

Figure 4:
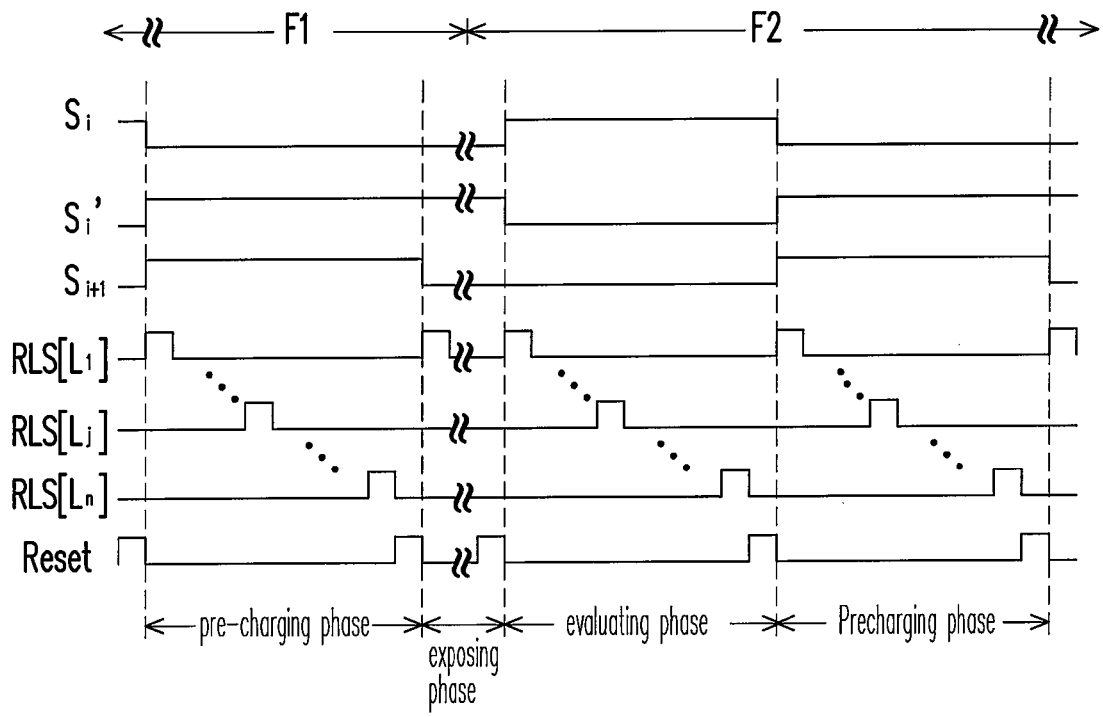
FIG. 4 is a timing diagram of the operation of the touch panel according to the embodiment of the present invention.

FIG. 4 is a timing diagram of the operation of the touch panel according to the embodiment of the present invention. Referring to FIG. 2 and FIG. 4, in the embodiment, the operation of the touch panel mainly has a pre-charging phase, an exposing phase and an evaluating phase. Take the sensor pixels corresponding to the scan line $S_i$ as an example. The sensor pixel 18 is first reset at the pre-charging phase: at the frame period F1 when the scan line $S_{i+1}$ is asserted, the scan line $S_i$ is unasserted (logic low for example) and the signal $S_i'$, inverse of the scan line $S_i$, is logic high, so as to turn on the reset transistor T2 and the base transistor T3, and then the first terminal of the sensing capacitor C1 has the voltage level of the second voltage VB and the second terminal N2 of the sensing capacitor C1 has the voltage level of the first voltage VA. That is, two terminals of the sensing capacitor C1 are pre-charged to the first voltage VA and the second voltage VB in the pre-charging phase.

After the pre-charging phase, the sensor pixel 18 is exposed in the exposing phase. In the exposing phase, the scan lines $S_i$ and $S_{i+1}$ are unasserted, such that only the base transistor T3 is turned on while other transistors T1, T2 and P1 are turned off. During the exposing phase, if the sensor pixel 18 is not covered by the finger or other object, the photo transistor P1 is exposed to the light and conducted so that the voltage of the second terminal N2 of the sensing capacitor C1 drops toward the second voltage VB. In another aspect, if the sensor pixel 18 is covered by the finger or other object, the photo transistor P1 is not exposed to the light and thus turned off, so that the voltage of the second terminal N2 of the sensing transistor C1 maintains the first voltage VA. If the sensor pixel 18 is partially exposed to the light, the voltage of the second terminal N2 of the sensing transistor C1 is held between the first voltage VA and the second voltage VB. Hence, in the embodiment, one of the sensor pixels 18 is judged to be touched while the voltage across the sensing capacitor C1 is greater than a presetting voltage. Otherwise, the sensor pixel 18 is judged to be not touched while the voltage across the sensing capacitor C1 is discharged to be less than the presetting voltage.

After the exposing phase, the sensor pixel 18 is evaluated in the evaluating phase. At the frame period F2 while the scan line $S_i$ is asserted, the transistors T1 and P1 are turned on while transistors T2 and T3 are turned off, and thus the voltage across the sensing capacitor C1 can be transmitted to the readout circuit 14 through the conducted readout transistor T1 and the readout line $R_j$. Therefore, the readout circuit 14 utilizes the voltage across the sensing capacitor C1 to evaluate whether the sensor pixel 18 is touched.

Figure 5A:
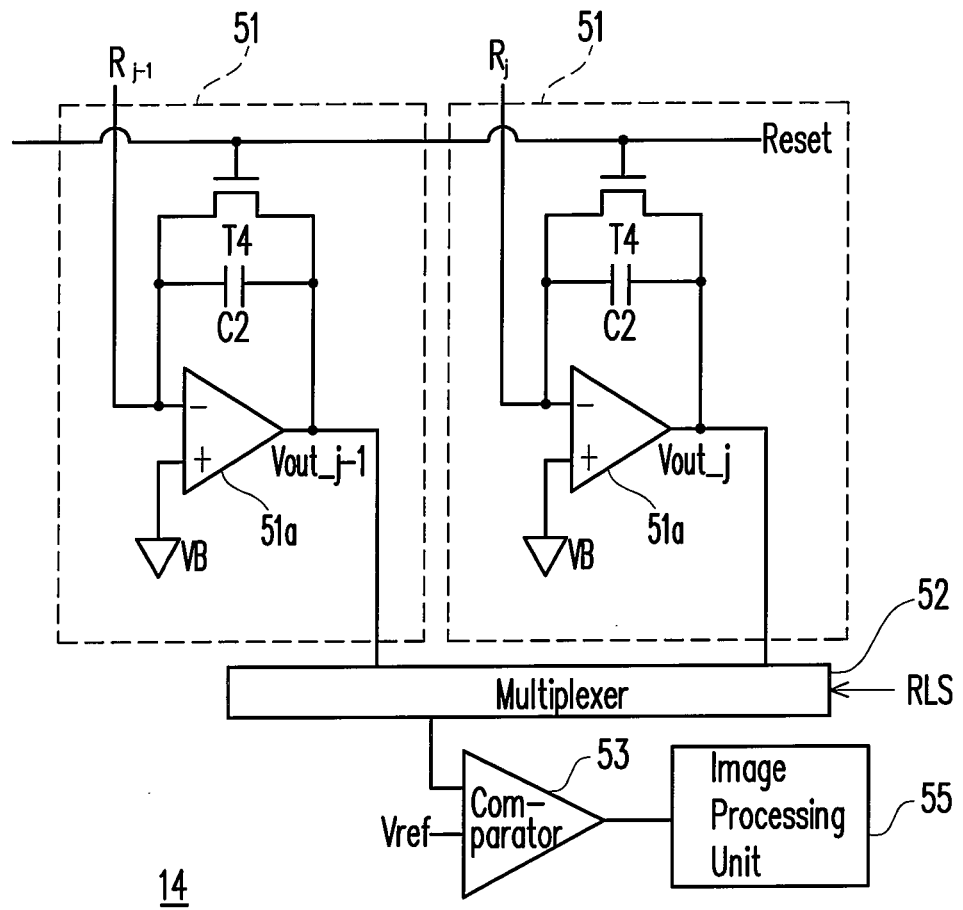
FIG. 5A is a circuit diagram of the readout circuit according to an embodiment of the present invention.

FIG. 5A is a circuit diagram of the readout circuit 14 according to the embodiment of the present invention. Referring to FIG. 1 and FIG. 5A, the readout circuit 14 includes a plurality of readout units 51 for respective readout lines. The readout circuit 14 further includes a multiplexer 52, a comparator 53 and an image processing unit 55. Take the readout unit 51 corresponding to the readout line $R_j$ for example. The readout unit 51 corresponding to the readout line $R_j$ includes an operational amplifier 51a, a first capacitor C2 and a first transistor T4. The operational amplifier 51a has an inverting terminal and a non-inverting terminal respectively coupled to the $j^{th}$ readout line $R_j$ and the second voltage VB, wherein $1 \leq j \leq n$. The operational amplifier 51a also has an output terminal to generate an output voltage Vout_j. The first capacitor C2 has a first terminal and a second terminal respectively coupled to the inverting terminal and the output terminal of the operational amplifier 51a. The first transistor T4 has a gate to receive a reset signal Reset, and has a first source/drain and a second source/drain respectively coupled to the inverting terminal and the output terminal of the operational amplifier 51a.

Referring to FIG. 4 and FIG. 5A, while the reset signal Reset is asserted, the first transistor T4 is conducted so that a residual voltage stored in the first capacitor C2 can be discharged via the conducted first transistor T4. The readout unit 51 is considered as an integrator, that is, the readout unit 51 corresponding to the readout line $R_j$ accumulates the voltage of the sensing capacitor C1 in FIG. 2 for judging whether the sensor pixel 18 is touched. Suppose at the end of the exposing phase, the second terminal N2 of the sensing capacitor C1 of the sensor pixel 18 to be read drops to a voltage VA'. The voltage VA' equals VB if the photo transistor P1 is exposed to the light; VA' equals to VA if the photo transistor P1 is not exposed to the light; VA' is between VA and VB if the photo transistor P1 is partially exposed to the light. Thus the charges stored in the sensing capacitor C1 is (VA'−VB)*C1. Therefore the output voltage Vout_j of the readout unit 51 is VB+(VA'−VB)*C1/C2.

The multiplexer 52 coupled to the readout units 51 selects the output voltage of one of the readout units 51 according to the readout line selecting signal RLS. When the $j^{th}$ bit $L_j$ of the readout line selecting signal RLS is asserted, the multiplexer 52 selects the output voltage Vout_j of the readout unit 51 corresponding to the readout line $R_j$. The comparator 53 is coupled to the output of the multiplexer 52 and compares the output voltage from the multiplexer 52 with a presetting voltage Vref and thereby outputs an output signal to the image processing circuit 55. If the output signal is logic high, the corresponding sensor pixel 18 is covered; else the sensor pixel 18 is uncovered.

Figure 5B:
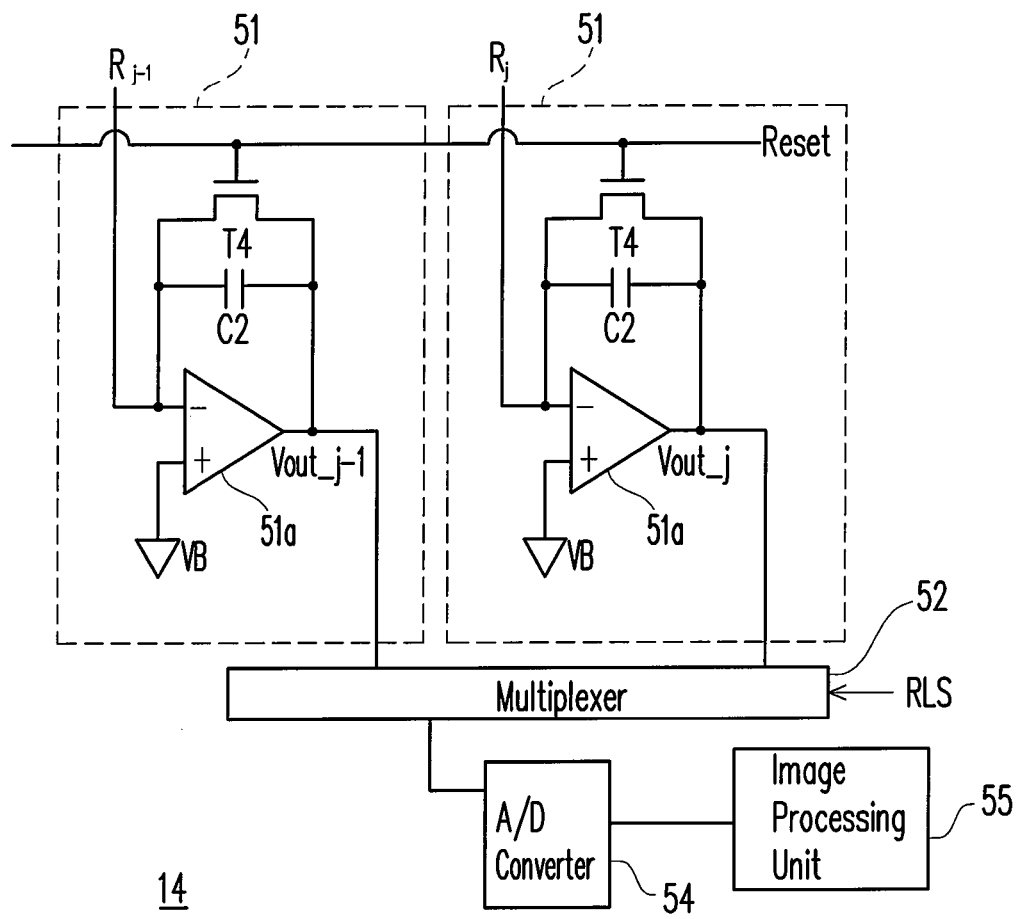
FIG. 5B is a circuit diagram of the readout circuit according to another embodiment of the present invention.

FIG. 5B is a circuit diagram of the readout circuit 14 according to another embodiment of the present invention. Referring to FIG. 5A and FIG. 5B, the difference between the embodiments in FIG. 5A and FIG. 5B is that the readout circuit 14 in FIG. 5B utilizes an analog to digital (A/D) converter 54 to replace the comparator 53 in FIG. 5A. The A/D converter 54 converts the output voltage Vout_j of the readout unit 51 which is an analog signal into a digital signal. The image processing unit 55 processes the digital signal to show the location or the image of the finger.

In summary, the said embodiments utilize the characteristic of light obstruction to detect the location of the finger or other objects. The sensor pixel including a photo transistor is applied to the touch panel since the photo transistor produces the photo leakage current when it is exposed to the light. Unlike the disadvantages of the resistive touch panel which have needs of disposing several layers, the said embodiments not only have better light transmission for display panel by utilizing the said structure, but also provide precise location detection of single finger or multi-finger.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A sensor pixel of a touch panel having m scan lines and n readout lines, the sensor pixel comprising:
    a sensing capacitor, having a first terminal and a second terminal, wherein a voltage across the sensing capacitor is read out through the $j^{th}$ readout line while the $i^{th}$ scan line is asserted, the voltage is employed to determine whether the sensor pixel is touched, and the sensor pixel is judged to be touched while the voltage across the sensing capacitor is greater than a presetting voltage;
    a readout transistor, having a gate coupled to the $i^{th}$ scan line, a first source/drain coupled to the $j^{th}$ readout line and a second source/drain coupled to the first terminal of the sensing capacitor, wherein $1 \leq i \leq m$ and $1 \leq j \leq n$;
    a reset transistor, having a gate coupled to the $(i+1)^{th}$ scan line, a first source/drain coupled to the second terminal of the sensing capacitor and a second source/drain coupled to a first voltage;
    a base transistor, having a gate receiving an inverted signal of the $i^{th}$ scan line, a first source/drain coupled to the first terminal of the sensing capacitor and a second source/drain coupled to a second voltage, wherein when the $i^{th}$ scan line is unasserted, the base transistor is turned on, and when the $i^{th}$ scan line is asserted, the base transistor is turned off; and
    a photo transistor, having a gate coupled to the $i^{th}$ scan line, a first source/drain coupled to the second terminal of the first capacitor and a second source/drain coupled to the second voltage, wherein the photo transistor is conducted when it is exposed to a light.

2. The sensor pixel as claimed in claim 1, wherein the sensor pixel is judged not to be touched while the photo transistor is exposed to the light and the voltage across the sensing capacitor is discharged to be less than the presetting voltage.

3. The sensor pixel as claimed in claim 1, wherein the voltage across the sensing capacitor is reset while the $(i+1)^{th}$ scan line is asserted.

4. A touch panel having m scan lines and n readout lines, comprising:
    a plurality of sensor pixels, wherein each of sensor pixels comprises:
    a sensing capacitor, having a first terminal and a second terminal, wherein a voltage across the sensing capacitor is read out through the $j^{th}$ readout line while the $i^{th}$ scan line is asserted, the voltage is employed to determine whether the sensor pixel is touched, and the sensor pixel is judged to be touched while the voltage across the sensing capacitor is greater than a presetting voltage;
    a readout transistor, having a gate coupled to the $i^{th}$ scan line, a first source/drain coupled to the $j^{th}$ readout line and a second source/drain coupled to the first terminal of the sensing capacitor, wherein $1 \leq i \leq m$ and $1 \leq j \leq n$;

a reset transistor, having a gate coupled to the (i+1)$^{th}$ scan line, a first source/drain coupled to the second terminal of the sensing capacitor and a second source/drain coupled a first voltage;

a base transistor, having a gate receiving an inverted signal of the i$^{th}$ scan line, a first source/drain coupled to the first terminal of the sensing capacitor and a second source/drain coupled to a second voltage, wherein when the i$^{th}$ scan line is unasserted, the base transistor is turned on, and when the i$^{th}$ scan line is asserted, the base transistor is turned off; and a photo transistor, having a gate coupled to the i$^{th}$ scan line, a first source/drain coupled to the second terminal of the first capacitor and a second source/drain coupled to the second voltage, wherein the photo transistor produces a photo leakage current when it is exposed to a light; and a readout circuit, respectively coupled to the readout lines for judging whether one of the sensor pixels is touched according to the voltage across the corresponding sensing capacitor.

5. The touch panel as claimed in claim 4, wherein the readout circuit comprises:

a plurality of readout units, each of the readout units comprising:

an operational amplifier, having an inverting terminal coupled to the j$^{th}$ readout line, an non-inverting terminal coupled to the second voltage and an output terminal generating an output voltage;

a first capacitor, having a first terminal coupled to the inverting terminal of the operational amplifier and a second terminal coupled to the output terminal of the operational amplifier; and a first transistor, having a gate receiving a reset signal, a first source/drain coupled to the inverting terminal of the operational amplifier and a second source/drain coupled to the output terminal of the operational amplifier.

6. The touch panel as claimed in claim 5, wherein the readout circuit further comprises:

a multiplexer, coupled to the readout units for selecting the output voltage of one of the readout units according to a readout line selecting signal;

a comparator, coupled to the multiplexer for comparing the output voltage of the one of the readout units with a reference voltage and thereby outputting an error signal; and an image processing unit, coupled to the comparator for processing the error signal and thereby showing the location of the touched sensed pixel.

7. The touch panel as claimed in claim 5, wherein the readout circuit further comprises:

a multiplexer, coupled to the readout units for selecting the output voltage of one of the readout units according to a readout line selecting signal;

an analog to digital converter, coupled to the multiplexer for converting the output voltage of the one of the readout units to a digital signal; and an image processing unit, coupled to the analog to digital converter for processing the digital signal and thereby showing the location of the touched sensor pixels.

8. The touch panel as claimed in claim 5, wherein a voltage across the first capacitor is reset while the reset signal is asserted.

9. The touch panel as claimed in claim 4, wherein the one of the sensor pixels is judged not to be touched while the photo transistor is exposed to the light and the voltage across the sensing capacitor is discharged to be less than the presetting voltage.

10. The sensor pixel as claimed in claim 4, wherein the voltage across the sensing capacitor is reset while the (i+1)$^{th}$ scan line is asserted.

* * * * *